United States Patent [19]

Iimura et al.

[11] Patent Number: 4,908,251
[45] Date of Patent: Mar. 13, 1990

[54] POROUS REINFORCEMENT SHEET

[75] Inventors: Mituo Iimura; Masatoshi Heguri; Satoru Gunji; Kenji Ikehara, all of Osaka, Japan

[73] Assignee: Nitto Denko Corporation, Osaka, Japan

[21] Appl. No.: 91,914

[22] Filed: Sep. 1, 1987

[30] Foreign Application Priority Data

Sep. 1, 1986 [JP] Japan .................... 61-205496

[51] Int. Cl.$^4$ .............................................. B32B 1/04
[52] U.S. Cl. ........................................ 428/68; 428/76;
428/136; 428/198; 428/201; 428/480; 428/500;
428/515; 428/316.6; 428/317.5; 428/317.7;
428/483; 428/520; 428/476.3; 428/323;
428/328; 428/331; 428/212; 428/286; 428/288
[58] Field of Search ............... 428/198, 201, 480, 500,
428/515, 316.6, 317.5, 317.7, 483, 520, 476.3,
323, 328, 331, 212, 286, 288, 68, 76, 136

[56] References Cited

U.S. PATENT DOCUMENTS

| 3,664,907 | 5/1972 | Brice | 428/317.7 |
| 3,666,595 | 5/1972 | Bauer | 428/317.7 |
| 4,293,615 | 10/1981 | Bowen et al. | 428/412 |

FOREIGN PATENT DOCUMENTS

| 0061369 | 9/1982 | European Pat. Off. | 428/317.7 |
| 0193938 | 9/1986 | European Pat. Off. | |
| 1159997 | 7/1969 | United Kingdom. | |
| 1162978 | 9/1969 | United Kingdom. | |

Primary Examiner—Ellis P. Robinson
Assistant Examiner—P. J. Ryan
Attorney, Agent, or Firm—Sughrue, Mion, Zinn, Macpeak & Seas

[57] ABSTRACT

A reinforcement type porous sheet comprising
(a) a laminated sheet comprising a hot melt type porous sheet and a plastic porous sheet, and
(b) a porous substrate bonded to the hot melt type porous sheet.

16 Claims, 1 Drawing Sheet

POROUS REINFORCEMENT SHEET

FIELD OF THE INVENTION

The present invention relates to a reinforcement type porous sheet which is permeable to gas and liquid, and is greatly improved in strength.

BACKGROUND OF THE INVENTION

Porous sheets for use as air permeable bags, pressure filtration membranes, filtration supports and so forth have been produced by the following methods:

(1) a method as described in Japanese Patent Application (OPI) No. 74667/75 (the term "OPI" as used herein refers to a "published unexamined Japanese Patent application") in which an inorganic filler capable of being eluted by acids, alkalis or water and a nonionic surface active agent having HLB (Hydrophilic-Lipophilic Balance) of 9 to 15 are added to a polyolefin resin, the resulting mixture is molded into a sheet and the sheet is stretched, and then the above inorganic filler is eluted by an acid or the like as described above to produce a porous sheet;

(2) a method as described in Japanese Patent Application (OPI) No. 43982/79 in which in the method as described in (1) above, an ethylene-vinyl acetate copolymer is used in place of the nonionic surface active agent having HLB of 9 to 15 to produce a porous sheet;

(3) a method as described in Japanese Patent Application (OPI) No. 47334/82 in which a filler and a liquid rubber are compounded to a polyolefin resin, the resulting composition is melt molded to obtain a sheet, and then the sheet is stretched to produce a porous sheet;

(4) a method as described in Japanese Patent Application (OPI) No. 20352/82 in which in the method as described in (3) above, polyhydroxy saturated hydrocarbon is used in place of the liquid rubber to produce a porous sheet; and (5) a method as described in Japanese Patent Application (OPI) No. 136334/84 in which a polyolefin resin selected from specified intermediate pressure and low pressure polyethylenes, and crystalline polypropylene, a filler, a polyhydroxy saturated hydrocarbon and an epoxy group-containing organic compound are compounded, the resulting composition is melt molded into a sheet, and then the sheet thus obtained is stretched to produce a porous sheet.

In accordance with the above methods, the objective sheet is directly obtained by stretching, or alternatively the porous sheet obtained by stretching is treated with an acid, for example, to elute the inorganic filler contained in the porous sheet, thereby obtaining the objective porous sheet having more increased permeability. This stretching causes orientation of molecules, thereby increasing the strength of the sheet. In this stretching, however, perforated holes are formed and the orientation of molecules becomes uneven and, furthermore, at the time of stretching, fine cracks are formed in the perforated holes of the sheet. This phenomenon occurs more frequently when the compatibility between the resin and the filler is poor, or the amount of the filler added is increased, or the stretching ratio is increased. As a result, disadvantages such as a decrease of the tensile strength in the stretched direction, a decrease of yield stress and a decrease of mechanical strength, are caused.

In order to overcome the above problems, a method has been proposed in which a porous substrate such as nonwoven, cloth, and porous plastic sheet, is used as a reinforcing member and laminated onto the porous sheet made of a synthetic resin.

In accordance with the above lamination method, a bonding agent or an adhesive is partially coated on a porous substrate and/or a plastic porous sheet, and at these portions, they are laminated.

The laminate obtained by partially bonding the porous substrate and the porous sheet using the adhesive, however, has disadvantages such that the bonding strength of the bonding agent is poor and layer separation sometimes occurs during the process of molding or in use, no sufficient reinforcing effect can be obtained, and reliability is poor.

On the other hand, in partially bonding the porous substrate and the porous sheet with a hot melt type adhesive, the problems as described above can be eliminated. In a case where the hot melt type adhesive is used, areas where the adhesive is coated are heated by the means of a heating member such as an embossing roll. Thus, it is necessary for the heating member to be controlled so as to be accurately brought into contact with the areas being heated. This produces the disadvantages that the production equipment becomes complicated and expensive, and the process of production of the sheet becomes complicated, thereby increasing the production costs.

As a result of extensive investigations, it has been found that if a plastic porous sheet is used as the porous sheet, a hot melt type porous sheet is sandwiched between the plastic porous sheet and a porous substrate, and the resulting laminate is heated and bonded, mechanical strength such as tensile strength or yield stress of the sheet is greatly increased.

SUMMARY OF THE INVENTION

Accordingly, the object of the present invention is to provide a reinforcement type porous sheet in which the adhesion between a porous substrate and a porous sheet is sufficiently high and which is excellent in permeability of fluids such as gas and liquid.

The reinforcement type porous sheet according to the present invention comprises a porous substrate, a hot melt type porous sheet and a plastic porous sheet which are bonded together at areas being bonded.

Figure 1:
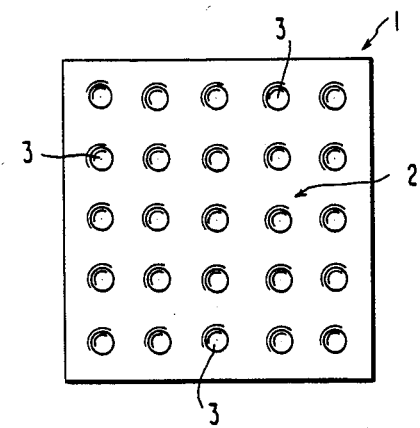
FIG. 1 is a plan view illustrating one embodiment of the present invention.

The reference numerals indicate the following parts.

1 ... Reinforcement type porous sheet, 2 ... Porous area, 3 ... Partially bonded area, 4 ... Porous substrate, 5 ... Plastic porous sheet, 6 ... Hot melt type porous sheet

DETAILED DESCRIPTION OF THE INVENTION

The porous substrate which can be used in the present invention is not particularly limited so long as it is a sheet-formed material which has the desired mechanical strength and is permeable to fluids such as liquid and gas. In more detail, cloth, nonwovens, porous plastic films such as punching films, porous materials made of glass fibers or metal fibers, and so forth can be used. In particular, nonwovens stretched in the width direction are preferably used.

That is, the present inventors have discovered that if the nonwoven is stretched in the width direction relative to the lengthwise direction, the mechanical strength such as tensile strength or yield stress of the nonwoven is increased, and the nonwoven having a low weight is sufficiently satisfactory in its practical use.

The material of the nonwoven is not particularly limited. However, a material having excellent bonding properties to the heat adhesive porous sheet is preferably used. For example, the nonwovens made of polyalkylene resins, such as polyethylene and polypropylene, are preferably used.

In a case where the reinforcement type porous sheet of the present invention is used in such applications as a diaper which comes into contact with the skin of human body, it is preferred for the fiber to be used in the production of the above nonwoven that the diameter be in the range of 0.2 to 15 denier and the fibers be much crossed, from the standpoints that the touch feeling is good and the suitability for stretching in the width direction is good.

If the diameter of fiber is more than 15 denier, the touch feeling is unsatisfactory, and thus the nonwoven using such fibers is unsuitable for use in such applications as a diaper which comes into contact with the human body. On the other hand, if the diameter of fiber is less than 0.2 denier, the mechanical strength such as tensile strength or yield stress sometimes becomes insufficiently low.

In a preferred embodiment of the present invention, the above nonwoven is stretched in the width direction. The stretching ratio in the width direction is preferably 1.5 times or more and more preferably 2 to 4.5 times. If the stretching ratio is less than 1.5 times, the desired mechanical strength sometimes cannot be obtained. On the other hand, if the stretching ratio is more than 4.5 times, breakage may occur during the process of stretching.

The weight of the nonwoven is preferably in the range of 20 to 300 g/m² prior to stretching from standpoints of, for example, touch feeling, mechanical strength such as tensile strength or yield stress, uniformity of nonwoven after stretching, and prevention of tear and breakage during the process of stretching.

There are no special limitations to the hot melt type porous sheet as used herein so long as it is a sheet-shaped porous material made of hot melt type resin and having a thickness of about 5 to 500 μm.

As the above hot melt type resin, any resin capable of adhering to the above porous substrate and the plastic porous sheet as described hereinafter on heating can be used. In more detail, ethylene-based copolymers such as ethylene-acrylate copolymers, e.g., an ethylene-vinyl acetate copolymer and an ethylene-isobutyl acrylate copolymer can be used. Of these polymers, an ethylene-vinyl acetate copolymer and an ethylene-acrylate copolymer are preferably used in that they have excellent bonding strength, are inexpensive and further are excellent in productivity or moldability.

As the hot melt type resin, those having a melting point at least 5° C., preferably at least 25° C., lower than those of the porous substrate and the plastic porous sheet as described hereinafter are preferably used because they do not cause heat degradation of the porous substrate and the plastic porous sheet.

Preferred for the above ethylene-based hot melt resin is to have a vinyl acetate content of 8 to 40 wt % and a melt index (MI) of 0.5 to 20 g/10 min, because such hot melt resins have an increased adhesion force and permit easy lamination onto the plastic porous sheet as described hereinafter.

The above hot melt type resin may contain various antioxidants.

As the plastic porous sheet as used herein, any porous sheet made of thermoplastic resin and having a thickness of about 10 to 1,000 μm can be used. In more detail, the sheets directly produced by monoaxial stretching or biaxial stretching or the sheets produced by obtaining porous sheets by stretching and then eluting the filler from the porous sheet with acids, alkali or water can be used.

The above thermoplastic resin includes a polyethylene resin, a polypropylene resin, a polyethylene terephthalate resin, a polyvinyl chloride resin, a polyvinylidene chloride resin, and a polyamide resin.

In production of the above plastic porous sheet, the usual molding machine and molding method can be used. For example, an inflation molding machine and a T-die molding machine are preferably employed. The sheet thus obtained is mono- or diaxially stretched to obtain a porous sheet. This stretching can be carried out by the usual method and by the use of the usual apparatus. For example, roll stretching, simultaneous diaxial stretching, and successive diaxial stretching can be employed.

In the stretching treatment, the stretching ratio is preferably 100 to 400% in the case of monoaxial stretching and 10 to 200% in the case of diaxial stretching from standpoints of the strength and size of perforated hole of the porous sheet, that is, permeability of gas and liquid. In the case of the monoaxial stretching, if the stretching ratio is less than 100%, the stretching is not uniform, that is, the stretched area and the unstretched areas are present in combination. On the other hand, if the stretching ratio is more than 400%, breakage may occur during the period of stretching.

The stretching ratio is determined by the following equation:

$$\text{Stretching Ratio (\%)} = \frac{\text{Dimension after Stretching} - \text{Dimensions before Stretching}}{\text{Dimensions before Stretching}}$$

As the above plastic porous sheet, a laminate of a linear low density polyethylene resin porous sheet and a hot melt type porous sheet is most preferred in that sheet moldability or productivity is high, production costs are low, and further in that the mechanical strength of the reinforcement type porous sheet obtained is high.

The above linear low density polyethylene resin is a copolymer of ethylene and α-olefin. The α-olefin includes butene, hexene and octene. This polyethylene resin has MI of 0.1 to 5 g/10 min, a density of 0.91 to 0.94 g/cc and a straight chain-like structure.

The above linear low density polyethylene resin porous sheet may contain a filler, if desired. The fillers which can be used include calcium carbonate, talc, clay, kaolin, silica, barium sulfate, kaolin sulfate, aluminum hydroxide, zinc oxide, calcium oxide, titanium oxide, alumina and silica.

The average particle diameter of the filler is preferably 30 μm or less and more preferably 0.1 to 10 μm. If the particle size is too large, the perforated hole is increased. On the other hand, if it is too small, coagulation occurs and dispersibility is poor.

In order to increase kneadability and dispersibility of the filler, or to increase moldability and workability, or to increase the functional strength of the porous member (sheet), an ethylene-propylene polymer or a softening agent may be compounded to the above linear low density polyethylene resin porous sheet.

There are no special limitations to the above ethylene-propylene polymer so long as it is a rubber-like substance having a number average molecular weight of 50,000 to 800,000. Representative examples thereof are an ethylene-propylene rubber (EPR), copolymers of ethylene, α-olefin and nonconjugated double bond-containing cyclic or noncyclic compound (hereinafter referred to as "EPDM"), and polyolefin elastomers composed of EPR or EPDM and crystalline olefin polymers.

EPDM is a terpolymer comprising ethylene, propylene or butene-1 and polyene monomers as described below. These polyene monomers include dicyclopentadiene, 1,5-cyclooctadiene, 1,1-cyclooctadiene, 1,6-cyclododecadiene, 1,7-cyclododecadiene, 1,5,9-cyclododecatriene, 1,4-cycloheptadiene, 1,4-cyclohexadiene, 1,6-heptadiene, norbornadiene, methylenenorbornene, ethylidenenorbornene, 2-methylpentadiene-1,4, 1,5-hexadiene, methyltetrahydroindene and 1,4-hexadiene.

With regard to copolymerization ratio, the proportion of ethylene is preferably 30 to 80 mol % and the proportion of polyene is 0.1 to 20 mol %, the remainder being α-olefin, and the Mooney viscosity $ML_{1+4}$ (temperature 100° C.) is preferably 1 to 60.

The above softening agent is not critical so long as it has a number average molecular weight of 1,000 to 30,000. Representative examples of the low viscosity softening agent are petroleum-based process oil, fluid paraffin, aliphatic oil and low molecular weight plasticizers. As relatively high viscosity softening agents, softening agents such as polybutene, low molecular weight polyisobutylene and liquid rubber are preferred.

In the present invention, the filler and the ethylene-propylene polymer or softening agent are sometimes compounded to the linear low density polyethylene resin. The proportion of the filler compounded is 100 to 300 parts by weight, preferably 150 to 250 parts by weight, per 100 parts by weight of the linear low density polyethylene, and the proportion of the ethylene-propylene polymer or softening agent compounded is 5 to 100 parts by weight, preferably 15 to 80 parts by weight, per 100 parts by weight of the linear low density polyethylene resin. By controlling the proportion of each component within the above range, a reinforcement type porous sheet having excellent mechanical strength and permeability to gas or liquid can be easily produced.

In mixing the linear low density polyethylene resin, the filler and the ethylene-propylene polymer or softening agent, no special apparatus is needed, that is, the conventional mixer can be used. In order to more increase film moldability by uniformly mixing the above components, it is preferred to use such mixers as mixing rolls, Banbury mixer, double screw kneaders and Henschel mixers.

The above plastic porous sheet may contain additives conventionally used, such as antioxidants, ultraviolet stabilizers, antistatic agents, lubricants and fluorescent agents.

The laminated sheet used in the reinforcement type porous sheet of the present invention can be produced by independently producing a hot melt type porous sheet and a plastic porous sheet and then laminating them. In addition, the desired laminated sheet can be produced by coextruding a hot melt type porous sheet composition and a plastic porous sheet composition using a two layer extruder to produce a laminate of a hot melt type porous sheet and a plastic porous sheet, and stretching the laminate in the predetermined direction at a temperature not higher than the melting point of the hot melt type porous sheet.

If the above obtained laminated sheet comprising the hot melt type porous sheet and the plastic porous sheet is subjected to heat treatment at a temperature not lower than the melting point of the hot melt type porous sheet and not higher than the melting point of the plastic porous sheet, a number of cracks having a length of about 10 to 2,500 μm and perforating the sheet from the top surface to the back are formed in strain areas existing in the hot melt type porous sheet, and thus air permeability and moisture permeability of the hot melt type porous sheet can be greatly increased. As a result, air permeability and moisture permeability of the reinforcement type porous sheet are greatly increased because they depend on those of the hot melt type porous sheet.

The porous substrate and the laminated sheet are bonded partially and/or over the entire surface. In the case of partial bonding, they are bonded over the surface constituting 5 to 80% of the entire surface. This bonding is applied uniformly and preferably continuously over the surface.

In forming partial bonding areas in the laminate comprising the porous substrate, the hot melt type porous sheet and the plastic porous sheet, a heating member such as embossing rolls is employed.

That is, when the above laminate is passed heated metallic rolls having embossing surface (convex, concave), it comes into contact with the top of convex portion and this convex portion, the hot melt type porous sheet is heated and softened, producing partial bonding areas, while on the other hand at the concave portion, the laminate does not come into contact with the metallic roll and thus at this portion, no bonded area is formed in the laminate.

In this case, it is necessary that heating is applied at a temperature not higher than the melting point of the porous substrate and that of the plastic porous sheet, preferably at a temperature 5° C. lower than the melting point.

In forming the partially bonded portion, the pressure is preferably 1 to 10 kg/cm$^2$.

By forming the partially bonded portion under the conditions as described above, the air permeability of the partially bonded portion can be decreased to 90% or less. By controlling the area of the above bonded portion and the air permeability of the bonded portion, the air permeability of the whole of the sheet can be controlled.

In order that the condition of adhesion between the porous substrate and the laminated sheet comprising the hot melt type porous sheet and the plastic porous sheet at the above partially bonded portion can be easily confirmed visually, it is preferred that at least one of the above two porous sheets is colored in the color different from that of the other sheet. The reason for this is that when two porous sheets having different colors are laminated and bonded together by partially heating, a difference in color density is formed between the bonded portion and the unbonded portion, and this difference in color density is determined by temperature and pressure at the time of bonding and is correlated with the adhesion strength and conditions of adhesion between the porous sheets.

For example, if a hot melt type resin sheet containing a pigment and a filler and a thermoplastic resin sheet containing a filler are stretched, the color of the colored sheet becomes light in comparison with that before stretching, the filler-containing sheet becomes white and at the same time, the two sheets become porous.

If s nonwoven is superposed on the hot melt type colored porous sheet of the two layer sheet and bonded by partially heating by means of embossing rolls, the nonwoven at the bonded area is compressed and formed into a film, and is color becomes like that of the colored porous sheet. On the other hand, the white layer (plastic porous sheet) becomes translucent and its color becomes like that of the colored porous sheet.

In a case where there is no change in color at the partially bonded portion, the heating temperature and time, and further the pressure are insufficiently low, and the adhesion strength is low. In this manner, the condition of adhesion (adhesion strength) can be easily determined visually by aid of the density in color.

The present invention has the above structure and the porous substrate increases the mechanical strength of the whole sheet and prevents problems such as breakdown of the sheet during use.

In the present invention, the porous substrate and the plastic porous sheet are partially bonded not by melting the porous sheet but by utilizing the hot melt type porous sheet sandwiched between the porous substrate and the plastic porous sheet. Thus, the mechanical strength of the bonded portion in the plastic porous sheet is not decreased, and quality is stabilized and reliability is increased.

When the nonwoven is stretched in the width direction, the mechanical strength, such as tensile strength and yield stress, of the whole porous sheet is increased, and troubles such as break-down of the sheet during use can be prevented.

Thus, the nonwoven has excellent mechanical strength such as yield stress even if it is thin and has a low weight, that is, is made of fine fibers. Accordingly, it exhibits excellent touch feeling and soft touch even if used in applications such that it is brought into contact with the skin of human body, such as disposable diaper. In the general structure of the disposable diaper, comprising a surface sheet having liquid permeability, an absorbing band and a back sheet having liquid nonpermeability, the porous sheet of the present invention can be used as the back sheet making use of its liquid nonpermeability and air permeability and thus feeling stuffy can be avoided.

The present invention is described in greater detail by reference to the following examples.

STRUCTURE OF REINFORCEMENT TYPE POROUS SHEET

Figure 2:
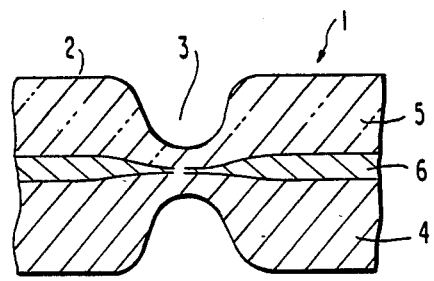
FIG. 2 is a cross-sectional view of the embodiment of FIG. 1.

In FIGS. 1 and 2, the reference numeral 1 indicates a reinforcement type porous sheet. This reinforcement type porous sheet 1 comprises a porous area 2 and a partially bonded area 3. This porous area 2 comprises a laminated area of a hot melt type porous sheet 6 sandwiched between the porous substrate 4 and the plastic porous sheet 5, a perforation hole (not shown) formed in the laminated area and a filler added if desired.

PRODUCTION OF REINFORCEMENT TYPE POROUS SHEET (1) Production of Plastic Porous Sheet A linear low density polyethylene resin (MI: 2.0; density: 0.93) as the polyethylene resin, EPDM (ethylene-propylene-ethylidenenorbornene; Mooney viscosity: 20; number average molecular weight: 300,000) as the ethylene propylene polymer, polybutene (number average molecular weight: 300,000) as the softening agent, calcium carbonate (average particle diameter: 2 $\mu$m; treated with fatty acid) and stearic acid as the lubricant as shown in Tables 1 and 2 were mixed in the proportions as shown in Tables 1 and 2 and sufficiently stirred. The resulting mixture was sufficiently kneaded with a twin screw kneader ("TEM-50", manufactured by Toshiba Kikai Co., Ltd.) to prepare a composition, which was then granulated by the conventional method.

TABLE 1

| Example No. | Composition (parts by weight) | | | | |
|---|---|---|---|---|---|
| | Polymer | Filler | Olefin Terpolymer | Softening Agent | Lubricant |
| Example 1 | 100 | 200 | 40 | 0 | 1.6 |
| Example 2 | 100 | 200 | 40 | 0 | 1.6 |
| Example 3 | 100 | 200 | 40 | 0 | 1.6 |
| Example 4 | 100 | 200 | 40 | 0 | 1.6 |
| Example 5 | 100 | 100 | 40 | 0 | 1.6 |
| Example 6 | 100 | 150 | 40 | 0 | 1.6 |
| Example 7 | 100 | 280 | 40 | 0 | 1.6 |
| Example 8 | 100 | 200 | 40 | 0 | 1.6 |
| Example 9 | 100 | 200 | 40 | 0 | 1.6 |
| Example 10 | 100 | 200 | 40 | 0 | 1.6 |
| Example 11 | 100 | 200 | 40 | 0 | 1.6 |
| Example 12 | 100 | 200 | 0 | 40 | 1.6 |
| Example 13 | 100 | 200 | 0 | 20 | 1.6 |
| Example 14 | 100 | 200 | 0 | 20 | 1.6 |
| Comparative Example 1 | 100 | 200 | 40 | 0 | 1.6 |
| Comparative Example 2 | 100 | 200 | 40 | 0 | 1.6 |

TABLE 2

| Example No. | Composition (parts by weight) | | | |
|---|---|---|---|---|
| | Polymer | Filler | Olefin Terpolymer | Lubricant |
| Example 15 | 100 | 200 | 40 | 1.6 |
| Example 16 | 100 | 200 | 40 | 1.6 |
| Example 17 | 100 | 200 | 40 | 1.6 |
| Example 18 | 100 | 200 | 40 | 1.6 |
| Example 19 | 100 | 200 | 40 | 1.6 |
| Example 20 | 100 | 200 | 40 | 1.6 |
| Example 21 | 100 | 200 | 40 | 1.6 |
| Example 22 | 100 | 200 | 40 | 1.6 |

100 parts by weight of an ethylene-vinyl acetate copolymer resin (vinyl acetate content: 25 wt %; MI: 2; density: 0.95) as the hot melt type resin and 200 parts by weight of calcium carbonate (average particle diameter: 2 $\mu$m; treated with fatty acid) were sufficiently mixed and kneaded by the use of a twin screw kneader ("TEM-50", manufactured by Toshiba Kikai Co., Ltd.) to prepare a composition, which was then granulated by the conventional method.

The above linear low density polyethylene resin composition and hot melt type resin composition were coextruded using a two layer extruder to obtain a laminate of a linear low density polyethylene resin sheet and a hot melt type resin sheet. This laminate was subjected to monoaxial stretching using a roll stretching machine (Examples 1 to 14 in Table 3), or diaxial stretching by the successive stretching method (Examples 15 to 22 in Table 4) to obtain polyethylene-based porous sheets having a stretching ratio as shown in Tables 3 and 4.

In this case, the stretching temperature was 40° C., the stretching speed was 6 m/min, and the stretching ratio was controlled as shown in Tables 3 and 4 by controlling the speed ratio of rolls.

The polyolefin porous sheet thus obtained was a porous sheet free from unevenness in stretching.

TABLE 3

| Example No. | Sheet Thickness (μm) | (Note 1) Stretching Ratio (%) |
| --- | --- | --- |
| Example 1 | 100 | 200 |
| Example 2 | 100 | 210 |
| Example 3 | 100 | 190 |
| Example 4 | 100 | 220 |
| Example 5 | 100 | 200 |
| Example 6 | 100 | 220 |
| Example 7 | 100 | 210 |
| Example 8 | 100 | 100 |
| Example 9 | 100 | 200 |
| Example 10 | 100 | 320 |
| Example 11 | 100 | 200 |
| Example 12 | 100 | 200 |
| Example 13 | 100 | 200 |
| Example 14 | 100 | 210 |
| Comparative Example 1 | 100 | 200 |
| Comparative Example 2 | 100 | 200 |

TABLE 4

| Example No. | Sheet Thickness (μm) | (Note 1) Stretching Ratio (longitudinal × width) (%) |
| --- | --- | --- |
| Example 15 | 100 | 100 × 200 |
| Example 16 | 100 | 100 × 210 |
| Example 17 | 100 | 100 × 190 |
| Example 18 | 100 | 100 × 220 |
| Example 19 | 100 | 100 × 200 |
| Example 20 | 100 | 100 × 220 |
| Example 21 | 100 | 100 × 210 |
| Example 22 | 100 | 100 × 100 |

EXAMPLES 1 TO 24

In each polyethylene-based porous sheet obtained, a porous substrate made of a 1 mm thick polypropylene nonwoven was laminated on the hot melt type resin porous member of the sheet, which was then passed through embossing rolls or flat roll and silicon rubber roll maintained at 100° C. and pressed at a pressure of 3 kg/cm² to obtain a reinforcement type porous sheet of the present invention as shown in Tables 5 and 6. In Examples 23 and 24 of Table 6, the polyethylene-based porous sheet used in Examples 1 and 2 were each heated at 95° C. and bonded to the nonwoven.

Characteristics of each material are shown in Tables 5 and 6.

COMPARATIVE EXAMPLE 1

A 100 μm thick sheet made of the above linear low density polyethylene resin composition was stretched to obtain a porous sheet. An acryl-based adhesive was coated on 10% of the total surface area of the porous sheet. On this adhesive coated surface was bonded the same porous substrate as above to prepare a sample.

COMPARATIVE EXAMPLE 2

A 100 μm thick sheet made of the above linear low density polyethylene resin composition as above was stretched (stretching ratio: 200%) to obtain a porous sheet. The same hot melt type resin as above was coated on 10% of the total surface area of the porous sheet, and the same porous substrate as above was laminated on the coated surface and bonded in the same manner as in the Examples to produce a sample.

Characteristics of each sample in Comparative Examples are shown in Tables 5 and 6.

TABLE 5

| Example No. | Bonded Area (%) | Lengthwise Direction | | Tear Force (Note 2) (kg) | Moisture Permeability (Note 3) (g/m² · 2 hr) | Air Permeability (Note 4) (sec/100 cc) | Interlaminar Strength (Note 5) (g/25 mm) |
| --- | --- | --- | --- | --- | --- | --- | --- |
| | | Strength (kg/cm width) | Elongation (%) | | | | |
| Example 1 | 10 | 4.0 | 40 | 1.2 | 2,800 | 1,100 | 200 |
| Example 2 | 25 | 3.8 | 45 | 1.1 | 2,300 | 1,500 | 250 |
| Example 3 | 50 | 4.0 | 45 | 1.2 | 1,900 | 1,300 | 400 |
| Example 4 | 60 | 3.9 | 40 | 1.3 | 1,800 | 1,800 | 500 |
| Example 5 | 25 | 3.8 | 41 | 1.1 | 700 | 4,200 | 250 |
| Example 6 | 25 | 4.0 | 41 | 1.2 | 1,800 | 1,900 | 240 |
| Example 7 | 25 | 3.8 | 45 | 1.2 | 3,500 | 800 | 230 |
| Example 8 | 25 | 4.0 | 50 | 1.3 | 400 | 6,000 | 240 |
| Example 9 | 25 | 4.1 | 45 | 1.2 | 2,300 | 1,500 | 230 |
| Example 10 | 25 | 4.2 | 46 | 1.3 | 3,000 | 900 | 240 |
| Example 11 | 100 | 4.5 | 46 | 1.2 | 1,600 | 2,000 | 600 |
| Example 12 | 10 | 4.0 | 48 | 1.1 | 2,700 | 1,200 | 200 |
| Example 13 | 30 | 4.0 | 45 | 1.2 | 2,200 | 1,300 | 260 |
| Example 14 | 50 | 4.0 | 45 | 1.1 | 1,800 | 1,900 | 400 |
| Comparative Example 1 | 10 | 4.0 | 45 | 1.1 | 2,700 | 1,100 | 150 |
| Comparative Example 2 | 10 | 4.0 | 45 | 1.2 | 2,000 | 1,700 | 180 |

TABLE 6

| Example No. | Bonded Area (%) | Lengthwise Direction Strength (kg/cm width) | Lengthwise Direction Elongation (%) | Tear Force (Note 2) (kg) | Moisture Permeability (Note 3) (g/m² · 2 hr) | Air Permeability (Note 4) (sec/100 cc) | Interlaminar Strength (Note 5) (g/25 mm) |
| --- | --- | --- | --- | --- | --- | --- | --- |
| Example 15 | 10 | 4.0 | 45 | 1.2 | 4,600 | 100 | 200 |
| Example 16 | 25 | 4.2 | 42 | 1.1 | 3,800 | 500 | 250 |
| Example 17 | 50 | 4.3 | 40 | 1.2 | 2,500 | 1,500 | 400 |
| Example 18 | 60 | 4.5 | 41 | 1.1 | 2,400 | 1,500 | 500 |
| Example 19 | 25 | 4.7 | 42 | 1.3 | 3,800 | 550 | 250 |
| Example 20 | 25 | 4.5 | 45 | 1.1 | 3,800 | 500 | 255 |
| Example 21 | 25 | 4.2 | 43 | 1.2 | 3,800 | 550 | 250 |
| Example 22 | 80 | 4.3 | 44 | 1.1 | 2,000 | 1,800 | 550 |
| Example 23 | 10 | 4.0 | 40 | 1.2 | 4,600 | 110 | 200 |
| Example 24 | 25 | 3.8 | 45 | 1.1 | 4,580 | 180 | 250 |

Note 1:
The stretching ratio shown in Tables 5 and 6 was determined by the following equation:

$$\text{Stretching Ratio (\%)} = \frac{\text{Dimensions after Stretching} - \text{Dimensions before Stretching}}{\text{Dimensions before Stretching}} \times 100$$

Note 2:
The tear force shown in Tables 5 and 6 was measured according to JIS L1096.
Note 3:
The moisture permeability shown in Tables 5 and 6 was measured by the moisture permeation cut method as prescribed in JIS L1099.
Note 4:
The air permeability shown in Tables 5 and 6 was measured according to JIS L1096.
Note 5:
The interlaminar adhesion force shown in Tables 5 and 6 was measured according to JIS Z0237.

EXAMPLE 25

To the above ethylene-vinyl acetate copolymer resin as the hot melt type resin, 0.5 part by weight of known pigment was added. The resulting mixture was coextruded in the same manner as above using a two layer extruder. The extruder material was subjected to the same monoaxial stretching treatment as above to obtain a two layer porous sheet. The hue of each of the bonded and non-bonded areas was evaluated. The results obtained are shown in Table 7.

TABLE 7

| Sample No. | Sheet Thickness (μm) | Stretching Ratio (Note 1) (%) | Color Bonded Area | Color Non-bonded Area |
| --- | --- | --- | --- | --- |
| Sample 1 | 100 | 200 | Green | White |
| Sample 2 | 100 | 210 | " | " |
| Sample 3 | 100 | 190 | " | " |
| Sample 4 | 100 | 220 | " | " |
| Sample 5 | 100 | 200 | Red | Light Pink |
| Sample 6 | 100 | 220 | " | " |
| Sample 7 | 100 | 210 | " | " |
| Sample 8 | 100 | 100 | " | " |
| Sample 9 | 100 | 200 | " | " |
| Sample 10 | 100 | 400 | " | " |
| Sample 11 | 100 | 200 | Yellow | White |
| Sample 12 | 100 | 200 | " | " |
| Sample 13 | 100 | 200 | " | " |
| Sample 14 | 100 | 210 | " | " |

EXAMPLE 26

A nonwoven (weight: 33 g/m²) made of polypropylene was stretched to 3 times the original length in the width direction at a temperature of 120° C.

The stretched nonwoven had a weight of 11 g/m², and had a soft touch feeling and a structure that the nonwoven was nappy on the surface; that is, the nonwoven having good touch feeling was obtained.

No stretch unevenness was observed in the above obtained nonwoven.

On the hot melt type sheet side of the polyolefin based porous sheet as used in Example 1 (Sample 1), Example 2 (Sample 2), Example 3 (Sample 3), Example 13 (Sample 4) and Example 14 (Sample 5), the above stretched nonwoven was laminated. The laminate thus obtained was passed through an embossing roll and a silicone rubber roll and heated to a temperature of 115° C. and pressed at a pressure of 5 kg/cm², and partially bonded in such a manner that the surface area as shown in Table 8 was obtained, to thereby obtain a reinforcement type porous sheet (1).

Characteristics of each sample are shown in Table 8.

TABLE 8

| Sample No. | Bonded Area (%) | Lengthwise Direction/Width Direction Strength (g/cm width) | Lengthwise Direction/Width Direction Elongation (%) | Tearing Force (Note 1) | Moisture Permeability (Note 2) (g/m² 24 hrs) | Weight Of Nonwoven (g/m²) |
| --- | --- | --- | --- | --- | --- | --- |
| Sample 1 | 10 | 760/220 | 40/50 | 500 | 4,800 | 11 |
| Sample 2 | 20 | 740/220 | 30/70 | 510 | 4,000 | 11 |
| Sample 3 | 50 | 750/210 | 35/50 | 550 | 2,700 | 11 |
| Sample 4 | 20 | 730/200 | 30/50 | 430 | 4,000 | 11 |
| Sample 5 | 20 | 780/250 | 30/40 | 480 | 4,050 | 11 |

While the invention has been described in detail and with reference to specific embodiments thereof, it will be apparent to one skilled in the art that various changes and modifications can be made therein without departing from the spirit and scope thereof.

What is claimed is:

1. A porous reinforcement sheet which is permeable to gases and liquids, comprising:
   (a) a laminated sheet comprising a plastic porous sheet comprising a thermoplastic resin, and a hot melt type porous sheet having a thickness of about 5 to 500 μm, comprising a hot melt polymer having a melting point at least 5° C. lower than that of the thermoplastic resin, said plastic porous sheet having numerous cracks of about 10 to 2,500 μm in length; and
   (b) a porous substrate which is permeable to gases and liquids and is directly adhered to the hot melt type porous sheet by the hot melt polymer.

2. The sheet as claimed in claim 1, wherein the porous substrate is nonwoven.

3. The sheet as is claimed in claim 1, wherein the porous substrate is nonwoven and stretched in a width direction, and the stretching ratio of the nonwoven porous substrate is 1.5 to 4.5 times.

4. The sheet as claimed in claim 1, wherein the hot melt porous sheet is made of an ethylene copolymer resin.

5. The sheet as claimed in claim 4, wherein the ethylene copolymer resin is an ethylene-vinyl acetate copolymer resin or an ethylene-acrylate copolymer resin.

6. The sheet as claimed in claim 1, wherein the plastic porous sheet is made of at least one member selected from the group consisting of a polyethylene resin, a polypropylene resin, a polyester resin, a polyvinyl chloride resin, a polyvinylidene chloride resin and a polyamide resin.

7. The sheet as claimed in claim 6, wherein the polyethylene resin is a linear low density polyethylene resin.

8. The sheet as claimed in claim 7, wherein the linear low density polyethylene resin contains a filler and at least one member selected from the group consisting of an ethylene-propylene polymer and a softening agent, wherein the average particle diameter of the filler is from a size such that coagulation does not occur as determined by the filler to 30 μm and said softening agent has a number average molecular weight of 1,000 to 3,000.

9. The sheet as claimed in claim 8, wherein the average particle diameter of the filler is 0.1 to 10 μm.

10. The sheet as claimed in claim 8, wherein the ethylene-propylene has a number average molecular weight of 50,000 to 800,000.

11. The sheet as claimed in claim 8, wherein the amount of the filler added is about 100 to 300 parts by weight per 100 parts by weight of the linear low density polyethylene resin and the amount of the ethylene-propylene polymer and/or the softening agent added is about 5 to 100 parts by weight per 100 parts by weight of the linear low density polyethylene resin.

12. The sheet as claimed in claim 1, wherein the melting point of the hot melt porous sheet is at least 5° C. lower than those of the porous substrate.

13. The sheet as claimed in claim 1, wherein at least one of the hot melt porous sheet and the plastic porous sheet is colored in a color different from that of the other sheet.

14. The sheet as claimed in claim 1, wherein said hot melt porous sheet is discontinuous so that said hot melt porous sheet covers from about 5 to 80% of the entire surface area of said plastic porous sheet. 7a.

15. The sheet as claimed in claim 1, wherein the air permeability of the bonded area is about 90% or less of that of the non-bonded area.

16. The sheet as claimed in claim 10, wherein the ethylene-propylene polymer is selected from the group consisting of:
   an ethylene-propylene rubber (ERP);
   copolymers of ethylene, α-olefin, and non conjugated double bound-containing cyclic or noncyclic compound (EPDM);
   polyolefin elastomers composed of ERP or EPDM and crystalline olefin polymers.

* * * * *